(12) United States Patent
Kuerner et al.

(10) Patent No.: US 6,973,515 B2
(45) Date of Patent: Dec. 6, 2005

(54) HOUSEHOLD APPLIANCE CONTROL METHOD FOR CONVERTING PROGRAM-SPECIFIC COMMANDS SELECTED AT INPUT-OUTPUT CONTROL INTO FUNCTIONAL COMMANDS FOR MACHINE UNIT VIA INTERFACE BETWEEN INPUT OUTPUT CONTROL AND MACHINE UNIT

(75) Inventors: Volkart Kuerner, Oppenweiler (DE); Manfred Mayr-Willius, Schorndorf (DE)

(73) Assignee: Whirlpool Corporation, Benton Harbor, MI (US)

( * ) Notice: Subject to any disclaimer, the term of this patent is extended or adjusted under 35 U.S.C. 154(b) by 350 days.

(21) Appl. No.: 10/108,976

(22) Filed: Mar. 28, 2002

(65) Prior Publication Data
US 2002/0147878 A1 Oct. 10, 2002

(30) Foreign Application Priority Data
Apr. 10, 2001 (DE) ................................ 101 17 931

(51) Int. Cl.$^7$ ............................................. G06F 13/14
(52) U.S. Cl. ........................ 710/72; 710/64; 710/305; 710/5
(58) Field of Search ................................ 710/305–306, 710/309, 316, 62–64, 72, 105–106, 73, 1–5; 709/216–218; 700/80–92

(56) References Cited

U.S. PATENT DOCUMENTS

| 3,639,844 A | * | 2/1972 | Karklys ...................... 327/269 |
| 3,662,186 A | * | 5/1972 | Karklys ...................... 307/141 |
| 3,685,022 A | * | 8/1972 | Raynes ....................... 700/179 |
| 3,986,040 A | * | 10/1976 | Karklys ...................... 307/141 |
| 4,245,310 A | * | 1/1981 | Kiefer ......................... 700/90 |
| 5,839,097 A | * | 11/1998 | Klausner ............... 340/825.69 |
| 5,886,732 A | * | 3/1999 | Humpleman ................. 725/49 |
| 5,956,487 A | * | 9/1999 | Venkatraman et al. ...... 709/218 |
| 6,243,707 B1 | * | 6/2001 | Humpleman et al. ....... 707/102 |
| 6,243,772 B1 | * | 6/2001 | Ghori et al. .................. 710/68 |
| 6,286,071 B1 | * | 9/2001 | Iijima .......................... 710/124 |
| 6,591,151 B1 | * | 7/2003 | Knopp et al. ................. 700/83 |
| 6,665,384 B2 | * | 12/2003 | Daum et al. ........... 379/102.03 |
| 6,812,881 B1 | * | 11/2004 | Mullaly et al. ............. 341/176 |

* cited by examiner

Primary Examiner—Paul R. Myers
Assistant Examiner—Raymond N Phan
(74) Attorney, Agent, or Firm—John F. Colligan; Robert O. Rice; Stephen Krefman

(57) ABSTRACT

The invention relates to a method for controlling a household appliance, particularly a washer or dishwasher, having an I/O control for programs and a machine unit comprising a central control that controls assigned functional units according to the selected program. The I/O control and the machine control achieve independence from one another in reference to their design and control, and an interface for the transmission of program-specific commands is provided between the I/O control and the machine unit, wherein the program selection criteria entered by the operator into the I/O control or the information received by the remote transmission is converted into assigned program-specific commands, and the incoming program commands are received by the machine unit and converted into functional commands for the functional units of the machine unit.

13 Claims, 1 Drawing Sheet

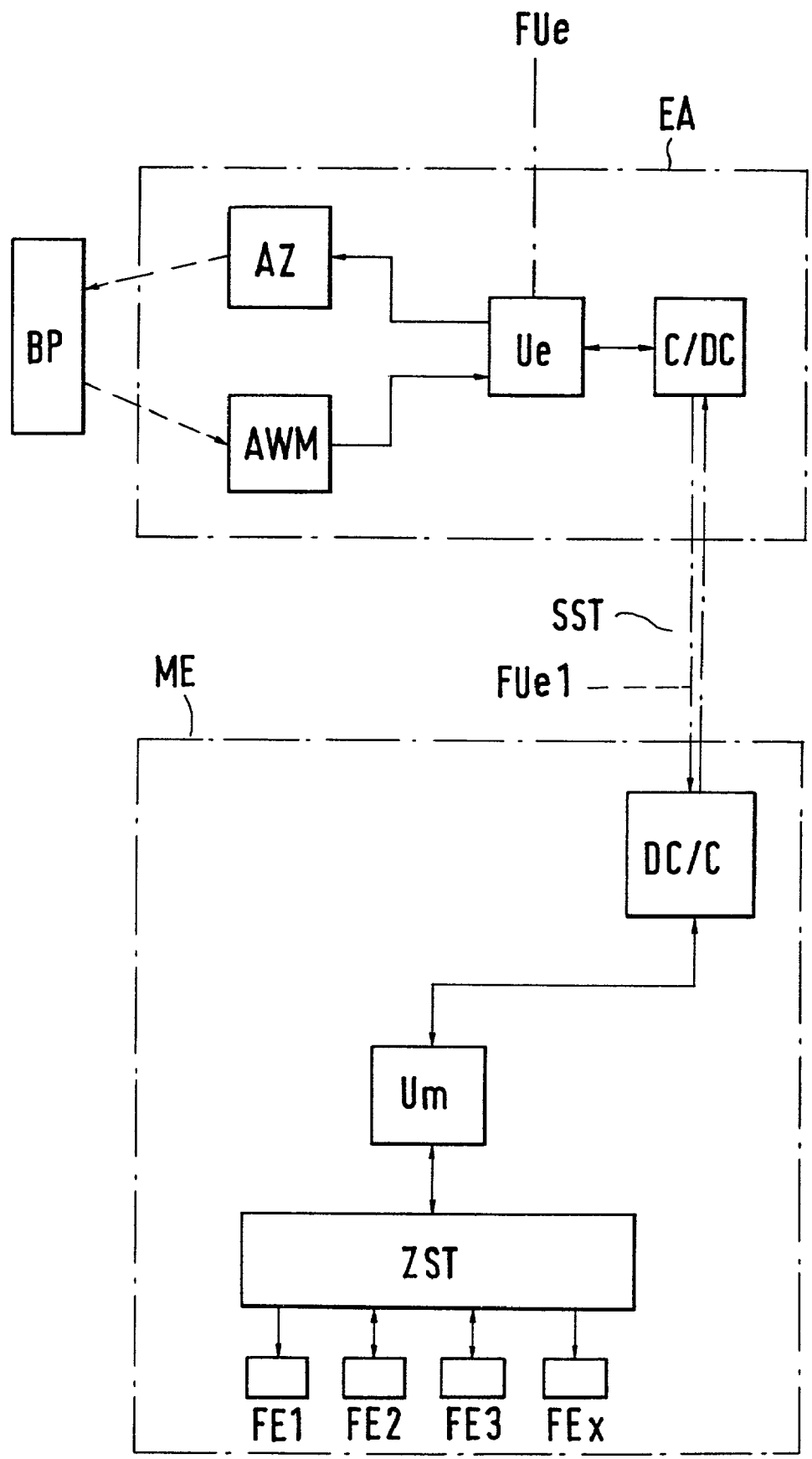

HOUSEHOLD APPLIANCE CONTROL METHOD FOR CONVERTING PROGRAM-SPECIFIC COMMANDS SELECTED AT INPUT-OUTPUT CONTROL INTO FUNCTIONAL COMMANDS FOR MACHINE UNIT VIA INTERFACE BETWEEN INPUT OUTPUT CONTROL AND MACHINE UNIT

BACKGROUND OF THE INVENTION

1. Field of the Invention

The invention relates to a method for controlling a household appliance, particularly a washer or dishwasher, having an I/O (Input/Output) control for programs and a centrally controlled machine unit that controls assigned functions according to the selected program.

This method differentiates between the I/O control and the function of the household appliance. The I/O control comprises all means for entering program data into the household appliance (e.g. program or option entry) or for displaying program data (e.g. remaining time, temperature, program) to the operator.

2. Description of the Related Art

The known household appliances have two basic control alternatives. The I/O control and the central control of the machine unit are integrated into one single electronic module. To increase flexibility, however, the I/O control can also be separate from the machine control, because in case of a change of the outside design, only the I/O control needs to be changed.

In these known embodiments, the components (e.g. switches, LEDs, etc.) of the I/O control are monitored by the central control of the machine unit, either by means of a matrix circuit or scanned via serial communication (e.g. via a shift register or a microprocessor in the I/O control). Thus, the software that controls the individual components of the I/O control is located in the central control and therefore has to be changed whenever the I/O control is changed. This may occur if a time display consisting of 4 LEDs is changed to a 7 segment display. Such changes to the software are undesirable, because they influence all other versions of the I/O controls (e.g. by means of increased error risk, increased software service and maintenance expenses, larger memory requirements and higher cost).

SUMMARY OF THE INVENTION

The object of the invention is to provide a method of the above mentioned kind that makes the design of the machine control and the formation of the I/O control independent from one another.

According to the invention, this objective is achieved in that an interface is created between the I/O control and the machine unit to transmit program-specific commands, that information that is entered into the I/O control by the operator or received via remote transmission can be converted into program-specific commands and that the entered program commands can be accepted and converted into functional commands for the functional units of the machine unit.

The design of the I/O control becomes independent from the version of the machine control by implementing an interface between the I/O control and the central control of the machine unit, because the same exchange of information occurs between these two units, even when the functional sequences change within the units. The I/O control can communicate with the central control of the machine unit via pre-defined, preferably standardized program-specific commands. The customer can enter a program selection criteria as a washing program and the service technician can enter the same as a test program.

This set of commands that is communicated between the I/O control and the central control of the machine unit is independent from the design of the actual machine, because it responds specifically to the individual commands. For a washer, the motor shut-on factor for the color cycle is selected individually for different machines, depending on the motor power. Consequently, the cycle time of two versions of the machine in the same cycle will differ, which, for instance, the machine control can communicate to the I/O control via the command "Display remaining time." For dishwashers, similar circumstances can occur under different conditions.

The program-specific commands of the interface are also independent from the design of the I/O control's actual version, which means that various I/O controls can be combined with a machine. The software running the machine control only comprises the interface protocol and the converter for the set of commands. Both units—the I/O control and the machine control—can be designed and changed independently from each other, and the interface with the pre-defined set of commands is used.

A preferred embodiment provides that the I/O control is equipped with a selection means for the program data to be selected, and a display means for the display of the selected program data, that the program data that are pre-defined via the selection means or received via remote transmission are converted into the program-specific commands by means of an input converter, and that the program-specific commands are transmitted to the machine unit, where they are converted into the control commands for the functional units. The input converter can be designed as a microprocessor.

To allow for two-way data communication via the interface, further development provides that the interface between the I/O control and the machine unit comprises a coder/decoder in the I/O control and a decoder/coder in the machine control as well as a two-way transmission link between the coder/decoder and the decoder/coder.

The transmission link can comprise a wired or wireless transmission of the program-specific commands.

According to one embodiment, the process in the new method provides that the program-specific commands in the I/O control are configured dependent on the chosen selection means via the input converter and the coder of the coder/decoder and routed to the transmission link, that the program-specific commands received by the machine unit are routed via the decoder of the decoder/coder to a machine-specific converter, and that the central control receives input signals from the machine-specific converter that are specific to the central control. The machine-specific converter can also be configured as a microprocessor.

According to one embodiment, the response to the display means can be conducted such that check-back signals are routed from the functional units and/or the central control to the machine-specific converter, which signals are converted by the coder of the decoder/coder in the machine unit and routed back to the I/O control via the transmission link, and that the check-back signals received from the decoder of the coder/decoder are received in the I/O control and converted by the input converter and displayed via the display means.

Further development provides that the remote control of a household appliance, e.g., via the Internet, can be achieved in that the information of the remote transmission is converted via the input converter and routed to the coder of the coder/decoder in the I/O control. A further simplification provides that the information from the remote transmission are configured as program-specific commands and are directly routed to the decoder of the decoder/coder in the machine unit.

The introduction of the standardized interface with program-specific commands provides for additional adjustment possibilities for a machine cycle offered.

One embodiment provides that the various I/O controls are configured with standardized program-specific commands which can be optionally connected with a machine unit that is adjusted to these program-specific commands.

Thus, a customer can choose between several I/O controls for the selected machine unit.

On the other hand, it is possible that various machine units that respond to the standardized program-specific commands are coupled with an I/O control which, in turn, is also adjusted to these program-specific commands. A machine unit that was selected among various machine units can be assigned to any selected I/O control.

According to one embodiment, the greatest flexibility is achieved in that I/O controls and machine units with varying configurations are provided that are all designed for the program-specific commands, and that one of the I/O controls can be optionally coupled with one of the machine units.

BRIEF DESCRIPTION OF THE DRAWINGS

The invention is explained in more detail with reference to an exemplary embodiment that is shown as a block diagram in the drawing.

DESCRIPTION OF THE PREFERRED EMBODIMENT

As shown in the block diagram, two units are configured for the control of the household appliance, which can be a washer or a dishwasher or another type of household appliance that can run with various programs. The difference consists merely of the selection means AWM in an I/O control EA and the selectable program data.

Operator BP of the household appliance enters the program data via selection means AWM, which are converted into program-specific commands via an input converter Ue and a coder C of a coder/decoder C/DC in I/O control EA. The input converter Ue can be configured as a microprocessor and also display program data via the display means AZ for the operator BP. Input converter Ue, coder C and the decoder can be combined in I/O control EA as an integrated circuit.

A machine unit ME, together with a central control ZST, embody a unit, the control technology of which is decoupled from I/O control EA via an interface SST, because only the pre-defined, preferably standardized program-specific commands—one or several code words—are transmitted between coder C of coder/decoder C/DC of I/O control EA and decoder CD of decoder/coder DC/C in machine unit ME. In the opposite direction, coder C of decoder/coder DC/C in machine unit ME transmits standardized responses to decoder DC of coder/decoder C/DC in I/O control EA, which are converted via input converter Ue and displayed in display means AZ. In machine unit ME, the required circuits can also be combined in one integrated module.

The transmission link of interface SST can be used in both transmission directions and can be configured wired or wireless; there are numerous state of the art embodiments.

As indicated by a remote transmission FUe, program data can be set externally and transmitted to input converter Ue. The control of the household appliance can then be performed, via the internet, for instance.

If the remote transmission is performed including the program-specific commands, an appropriate remote transmission Fue1 can be coupled directly with machine unit ME.

In machine unit ME, the received program-specific commands are converted via a machine-specific converter Um into the control commands for central control ZST. Central control ZST then controls the functional units FE1, FE2, FE3, FEx in the selected version of central control ZST. This means that the conversion process of the program data in I/O control EA does not impede the actual process of the machine control in machine unit ME, and that both processes are independent from one another and that they can be configured differently, if both units EA and ME use the pre-defined and standardized, program-specific commands of interface SST.

The output of I/O control EA and the input of machine unit ME are solely adjusted to this standardized set of commands, and can thus be developed and configured independently from one another.

This allows for a plurality of possible combinations, if a set of I/O controls EA that function and are designed differently, can be optionally coupled with machine controls having different processes in different machine units ME. The only prerequisite is the interface with the set of commands, which can easily be achieved via the output of I/O control EA and the input of machine unit ME.

We claim:

1. A method for controlling a household appliance, particularly a washer or a dishwasher, having an I/O control for programs and a machine unit comprising a central control that controls assigned functional units according to the selected program, wherein an interface is configured between the I/O control and the machine unit for the transmission of program-specific commands, wherein in the I/O control the program selection criteria entered by an operator, or information received by a remote transmission, are converted into assigned program-specific commands, wherein the program commands are received by the machine unit and converted into the functional commands for the functional units of the machine unit, wherein the I/O control is provided with selection means for the program data to be selected, and display means for the display of the selected program data, wherein the program data that was pre-defined by the selection means or that are received from the remote transmission are converted into the program-specific commands via the input converter, wherein the program-specific commands are transmitted to the machine unit and converted into the functional commands for the functional units, wherein the interface between the I/O control and the machine unit comprises a coder/decoder in the I/O control and a decoder/coder in the machine unit as well as a two-way transmission link between the coder/decoder and the decoder/coder, wherein the program-specific commands in the I/O control are configured depending on the chosen selection means via the input converter and the coder of the coder/decoder and are routed to the transmission link, wherein the program-specific commands received by the machine unit are routed to a machine-specific converter via the decoder of decoder/coder, wherein the central control receives input signals from the machine-specific converter that are specific to the central control, wherein the functional units and/or the central control route check-back signals to the machine-specific converter which are converted in the machine unit via the coder of the decoder/coder and routed back to the UO control via the transmission link, and wherein the incoming check-back signals from the decoder of the coder/decoder are received in the I/O control, and converted by the input converter and displayed via the display means.

2. The method according to claim 1, wherein the information from the remote transmission is converted via the input converter and routed to the coder of the coder/decoder in the I/O control.

3. The method according to claim 1, wherein the information from the remote transmission is configured as program-specific commands and is directly routed to the decoder of the decoder/coder in the machine unit.

4. The method according to claim 3, wherein UO controls with varying configurations are configured with standardized program-specific commands that can be optionally connected with the machine unit that is adjusted to these program-specific commands.

5. The method according to claim 3, wherein various machine units that respond to the standardized program-specific commands are optionally coupled with the I/O control which, in turn, is also adjusted to these program-specific commands.

6. The method according to claim 3, wherein I/O controls and machine units with varying configurations are provided, which are all configured for the program-specific commands, and one of the I/O controls is optionally coupled with one of the machine units.

7. A method for controlling a household appliance comprising an I/O control for programs and a machine unit comprising a central control that controls assigned functional units according to the selected program:

wherein an interface is configured between the I/O control and the machine unit for the transmission of program-specific commands;

wherein the I/O control is provided with display means for the display of the selected program data;

wherein in the I/O control the program selected by the user is converted into assigned program-specific commands;

wherein the interface between the I/O control and the machine unit comprises a coder/decoder in the I/O control and a decoder/coder in the machine unit;

wherein the interface between the I/O control and the machine unit comprises a two-way transmission link between the coder/decoder and the decoder/coder wherein the program-specific commands received by the machine unit are routed to a machine-specific converter via the decoder of the decoder/coder;

wherein the program-specific commands are received by the machine unit via the interface and converted into functional commands for the functional units of the machine unit;

wherein the functional units and/or the central control route check-beck signals to the machine-specific converter, which are converted in the machine unit via the coder of the decoder/coder and routed back to the I/O control via the transmission link; and wherein the incoming check-back signals from the decoder of the coder/decoder are received in the I/O control, and converted by the input converter and displayed via the display means.

8. The method according to claim 7, wherein the information from the remote transmission is converted via the input converter and routed to the coder of the coder/decoder in the I/O control.

9. The method according to claim 7, wherein the information from the remote transmission is configured as program-specific commands and is directly routed to the decoder of the decoder/coder in the machine unit.

10. The method according to claim 7, wherein the programs define cycles of operation for the household appliance.

11. The method according to claim 9, wherein I/O controls with varying configurations are configured with standardized program-specific commands that can be optionally connected with the machine unit that is adjusted to these program-specific commands.

12. The method according to claim 9, wherein various machine units that respond to the standardized program-specific commands are optionally coupled with the I/O control which, in turn, is also adjusted to these program-specific commands.

13. The method according to claim 9, wherein I/O controls and machine units with varying configurations are provided, which are all configured for the program-specific commands, and one of the I/O controls is optionally coupled with one of the machine units.

* * * * *